(12) United States Patent
Laurilehto et al.

(10) Patent No.: US 7,047,899 B2
(45) Date of Patent: May 23, 2006

(54) BARGE ARRANGEMENT, BARGE UNIT AND TUG UNIT

(75) Inventors: Mika Laurilehto, Turku (FI); Oskar Levander, Turku (FI)

(73) Assignee: Wartsila Finland Oy, Vaasa (FI)

( * ) Notice: Subject to any disclaimer, the term of this patent is extended or adjusted under 35 U.S.C. 154(b) by 0 days.

(21) Appl. No.: 11/054,640

(22) Filed: Feb. 8, 2005

(65) Prior Publication Data
US 2005/0172880 A1 Aug. 11, 2005

(30) Foreign Application Priority Data
Feb. 9, 2004 (FI) .................................. 20045030

(51) Int. Cl.
*B63B 21/56* (2006.01)

(52) U.S. Cl. ...................... 114/248; 114/74 R; 114/260
(58) Field of Classification Search ............. 114/65 R, 114/248, 251, 260, 269, 72, 74 R; 123/304

See application file for complete search history.

(56) References Cited

U.S. PATENT DOCUMENTS

| | | | |
|---|---|---|---|
| 2,795,937 A | 6/1957 | Sattler et al. | 114/269 |
| 3,815,540 A | 6/1974 | Peereboom | 114/248 |
| 3,828,708 A * | 8/1974 | Gerwick et al. | 114/74 R |
| 4,924,822 A * | 5/1990 | Asai et al. | 123/304 |
| 5,711,270 A * | 1/1998 | Pedersen | 123/304 |
| 5,803,005 A * | 9/1998 | Stenning et al. | 114/72 |
| 6,240,867 B1 * | 6/2001 | Hoyle et al. | 114/65 R |
| 6,786,166 B1 * | 9/2004 | Marchand et al. | 114/74 R |

* cited by examiner

*Primary Examiner*—Lars A. Olson
(74) *Attorney, Agent, or Firm*—Smith-Hill and Bedell

(57) ABSTRACT

A barge unit includes LNG receptacle and a first power generation apparatus including a first combustion engine that is operated at least partly by LNG boil-off gas and a first generator that is driven by the first combustion engine. A tug unit includes a propulsion system and a second power generation apparatus for providing power to the propulsion system. In a first operating mode of the barge and tug units the tug unit is connected to the barge unit for propelling the barge unit and the propulsion system of the tug unit is powered at least partly by the first power generation apparatus.

23 Claims, 10 Drawing Sheets

BARGE ARRANGEMENT, BARGE UNIT AND TUG UNIT

CROSS REFERENCE TO RELATED APPLICATION

This application claims priority under 35 USC 119 of Finnish Patent Application No. 20045030 filed Feb. 9, 2004.

BACKGROUND OF THE INVENTION

The present invention relates to a barge arrangement comprising a barge unit provided with a load carrying facility and a tug unit provided with a propulsion system.

Such barge arrangements are previously known. Generally they are of a pusher-barge type, where the tug unit pushes the barge unit. The more conventional versions have a pulling tug unit. The tug unit is normally provided with an independent propulsion system, whereby the barge unit is provided for load carrying only.

SUMMARY OR THE INVENTION

The basic idea of the invention is to provide an LNG (liquefied natural gas) transportation system comprising a barge arrangement, in which the barge unit is provided with at least one LNG receptacle, basically a tank, and a first power generating means, which at least partly is run by means of LNG boil-off gas. This first power generating means may also power the gas evaporation and/or the gas supply in connection with the unloading of the barge unit. The tug unit is provided with a propulsion system and a second power generating means for providing power to the propulsion system when the tug unit operates freely, without the barge, in a second operating mode of the barge arrangement. In a first operating mode of the barge arrangement, in which the barge unit and the tug unit are connected to each other for the transport of the barge, the propulsion system of the tug unit is powered at least partly by the first power generating means, thus utilising the energy created by the boil-off gas.

This transportation system has a number of advantages.

First of all, the tug unit with the propulsion system may always be in operation, as no dead time in port for loading and unloading is necessary. The installed engine power may be used for different purposes in different operation modes, thus enabling a high utilisation rate for the engines. The tug unit can transport and leave a full barge unit for unloading at appropriate destination areas, e.g. user gas networks, and transport and leave an empty barge for loading gas at supply terminals, e.g. gas fields. The number of separate tug units and barge units in the transportation system may be optimized according to prevailing needs.

Secondly, this provides for using the energy created from the boil-off gas as a source of energy for the actual transporting or pushing of the barge unit by the tug unit as well as for the LNG handling on board the barge unit. Additionally all gas installations remain on the barge unit.

Finally, the barge arrangement according to the invention allows for lower costs. The barge unit can be used as a gas terminal, whereby the capital costs are lower than the costs of a separate land based gas terminal. The costs of the barge arrangement compared to a typical LNG tanker are also lower. This may further be influenced by the relative number of tug units and barge units in the transportation system, whereby even the crew or personnel costs may be lower than on a conventional LNG tanker. Also, as already indicated above, there is no dead time in the operation of the transportation system. These features also provide for more flexibility of the transportation system as a whole.

In order to provide power that is easy to handle, i.e. to transmit from the barge unit to the tug unit, the first power generating means preferably comprises a first combustion engine and a first generator driven by the combustion engine. The first generator is arranged to feed electric power to a first main switchboard on the barge unit. For the unloading of natural gas from the LNG-receptacle, the barge unit is provided with a gas evaporation means and a gas supply means, of which either the gas evaporation means or the gas supply means, or both, advantageously may be powered by the first main switchboard. In order to be able to transfer power to the tug unit, the barge unit comprises a first power connection element connected to the first main switchboard.

The tug unit may be equipped with different types of propulsion systems and second power generation means.

The propulsion system may comprise a mechanical propulsion unit and an electrical propulsion unit. The mechanical propulsion unit may be run by the second power generating means, comprising a second combustion engine. The electrical propulsion unit may be run on electric power generated on the barge unit, whereby the tug unit comprises a second power connection means connected to the electrical propulsion unit.

The second power generating means may also comprise a second main switchboard on the tug unit, whereby the second power connection means may be connected to the electrical propulsion unit or the second main switchboard. The electrical propulsion unit may advantageously also be connected to the second main switchboard.

The propulsion system may alternatively comprise a combined mechanical and electrical propulsion unit, whereby the second power generating means comprises a second combustion engine and an electric motor connected to the propulsion unit. The electric motor may be run on electric power generated on the barge unit, whereby the tug unit comprises a second power connection means connected to the electrical motor.

The second power generating means may also comprise a second main switchboard on the tug unit, whereby the second power connection means may be connected to the electric motor or the second main switchboard. The electric motor may advantageously also be connected to the second main switchboard.

A third power generating means, advantageously comprising a third combustion engine and third generator, is advantageously provided on the tug unit for its hotel load. If the tug unit is provided with a second main switchboard, the third generator is advantageously arranged to feed electric power to the second main switchboard on the tug unit. In this way the coordination and distribution of electric power on the barge arrangement, both in its first mode, when the barge unit and tug unit are engaged, and in its second mode, when the tug unit operates freely, can be optimized.

Further, the propulsion system may comprise an electrical propulsion unit, whereby the second power generating means comprises a second combustion engine and a second generator, which is connected to a second main switchboard on the tug unit. The electrical propulsion unit is connected to the second main switchboard. When the tug unit pushes the barge unit, the electrical propulsion unit may be run by electric power generated on the barge unit, whereby the tug unit comprises a second power connection means connected to the second main switchboard on the tug unit.

The present invention also relates to a barge unit. The barge unit fulfils another object of the invention, i.e. to provide an independent component in a flexible LNG transportation system, the number of which may be varied in the system according to its design. The barge unit as such can be used both for the transportation of LNG and as a terminal at the destination area. The barge unit carries out the loading operation and the unloading operation independently of a tug unit.

The present invention further relates to a tug unit. The tug unit fulfils another object of the invention, i.e. to provide an independent component in a flexible LNG transportation system, the number of which may be varied in the system according to its design. The tug unit as such can be used for the transportation of the barge unit, and also independently, if desired.

BRIEF DESCRIPTION OF THE DRAWINGS

In the following the present invention is described in more detail, by way of example only, with reference to the attached schematic drawings, in which.

DETAILED DESCRIPTION

Figure 1:
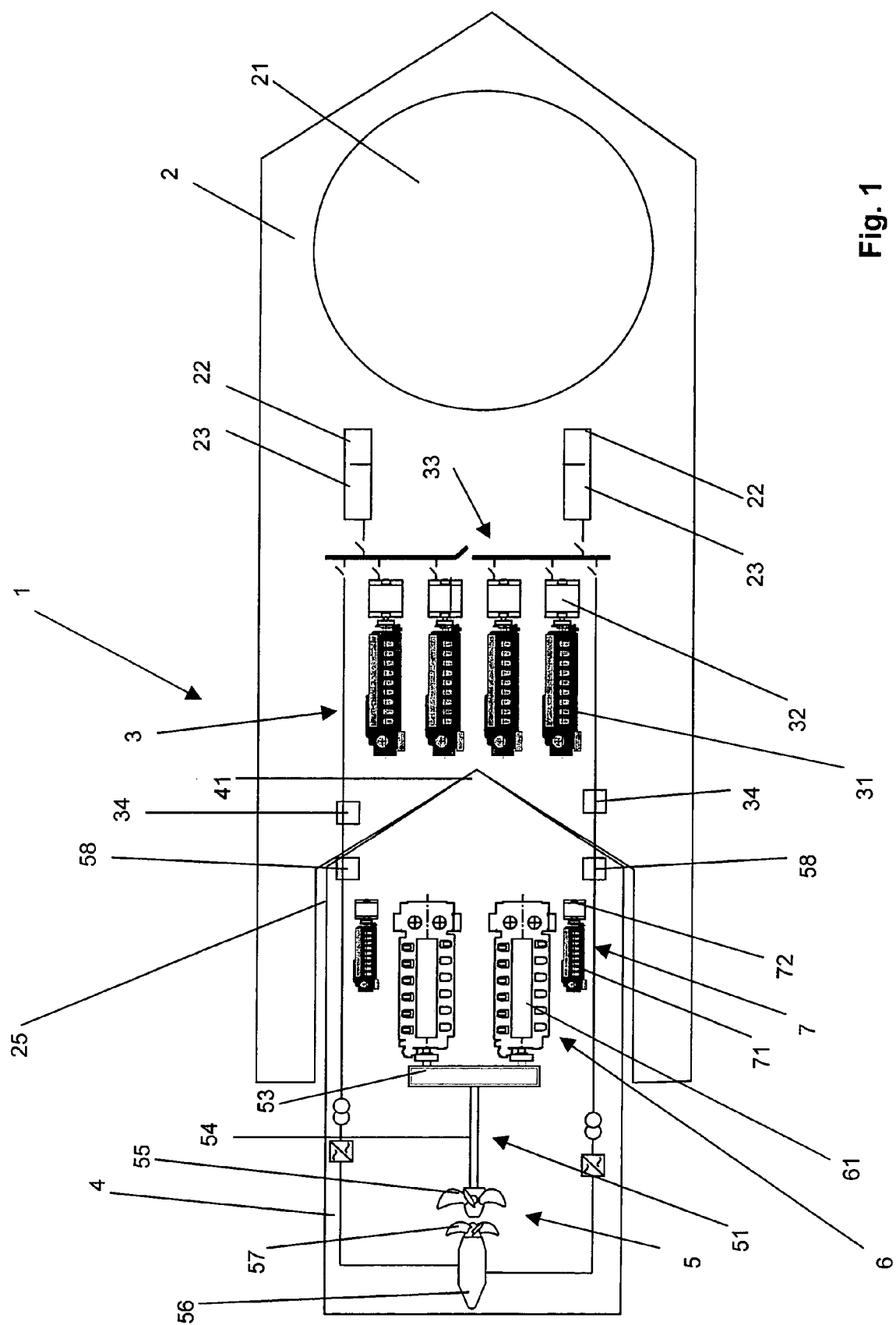
FIG. 1 shows a first embodiment of a barge arrangement.

In FIG. 1 the barge arrangement is indicated by reference numeral 1. The barge arrangement 1 comprises a barge unit 2, with a load carrying facility in the form of an LNG receptacle 21 or tank, and a first power generating means 3, and a tug unit 4, with a propulsion system 5 and a second power generating means 6.

This barge arrangement is in the form of a pusher-barge system, in which the barge unit 2 has a recess 25 in the aft for receiving a front end 41 of the tug unit 4. It is clear that also other forms of barge arrangements may be used, for example with a pulling tug unit.

The first power generating means 3 on the barge unit 2 comprises a set of four first combustion engines 31 coupled to respective first generators 32. The first generators 32 feed electrical power to the barge unit's main switchboard 33. The combustion engines are preferably gas driven engines or dual-fuel engines run by boil-off gas or forced boil-off gas from the LNG receptacle 21. Electrical power is drawn from the first main switchboard 33 for powering the gas evaporation means 22 and/or the gas supply means 23 when the barge unit 2 is at the destination area for unloading. The first main switchboard 33 includes connectors, switches, etc. and is connected to a first power connection element 34. Appropriate power connections are indicated by lines in the drawing.

The second power generating 6 means on the tug unit 4 comprises a set of two second combustion engines 61, for example diesel engines. The propulsion system 5 comprises a mechanical propulsion unit 51, coupled to the second power generating means 6, and an electrical propulsion unit 56, for example a turnable propulsion pod with a propeller 57. The mechanical propulsion unit 51 typically comprises a gear 53, shaft 54 and propeller 55. The electrical propulsion unit 56 is connected to a second power connection element 58.

The power connection elements 34, 58 may for example be arranged in the recess 25 in the aft of the barge unit 2 and in the front end 41 of the tug unit 4 as shown in FIG. 1. The first power connection element 34 on the barge unit is connected to the second power connection element 58 on the tug unit 4 when the tug unit 1 is connected to the barge unit 2.

In a first operating mode of the barge arrangement 1, in which the barge unit 2 and the tug unit 4 are connected or engaged to each other (as shown in FIG. 1) and the tug unit 4 transports or pushes the barge unit 2, the tug unit 4 is propelled by the electrical propulsion unit 56, which then is powered by the electrical power generated on the barge unit 2. Practically this means that electrical power is delivered from the first main switchboard 33 on the barge unit 2 to the electrical propulsion unit 56 on the tug unit 4. Appropriate power connections between the first power connection element 34 and the first main switchboard 33 and the second power connection element 58 and the electrical propulsion unit 56, including suitable transformers, are indicated by lines in the drawing.

In a second operating mode of the barge arrangement 1, in which the tug unit 4 operates freely without the barge unit 2, the tug unit 4 is propelled by the mechanical propulsion unit 51 run by the second power generating means 6.

The tug unit 4 may further be provided with some electric production capacity of its own, by way of a third power generating means 7, comprising a third combustion engine 71 and a third generator 72, for example for the hotel load (not shown) of the tug unit 4.

Figure 2:
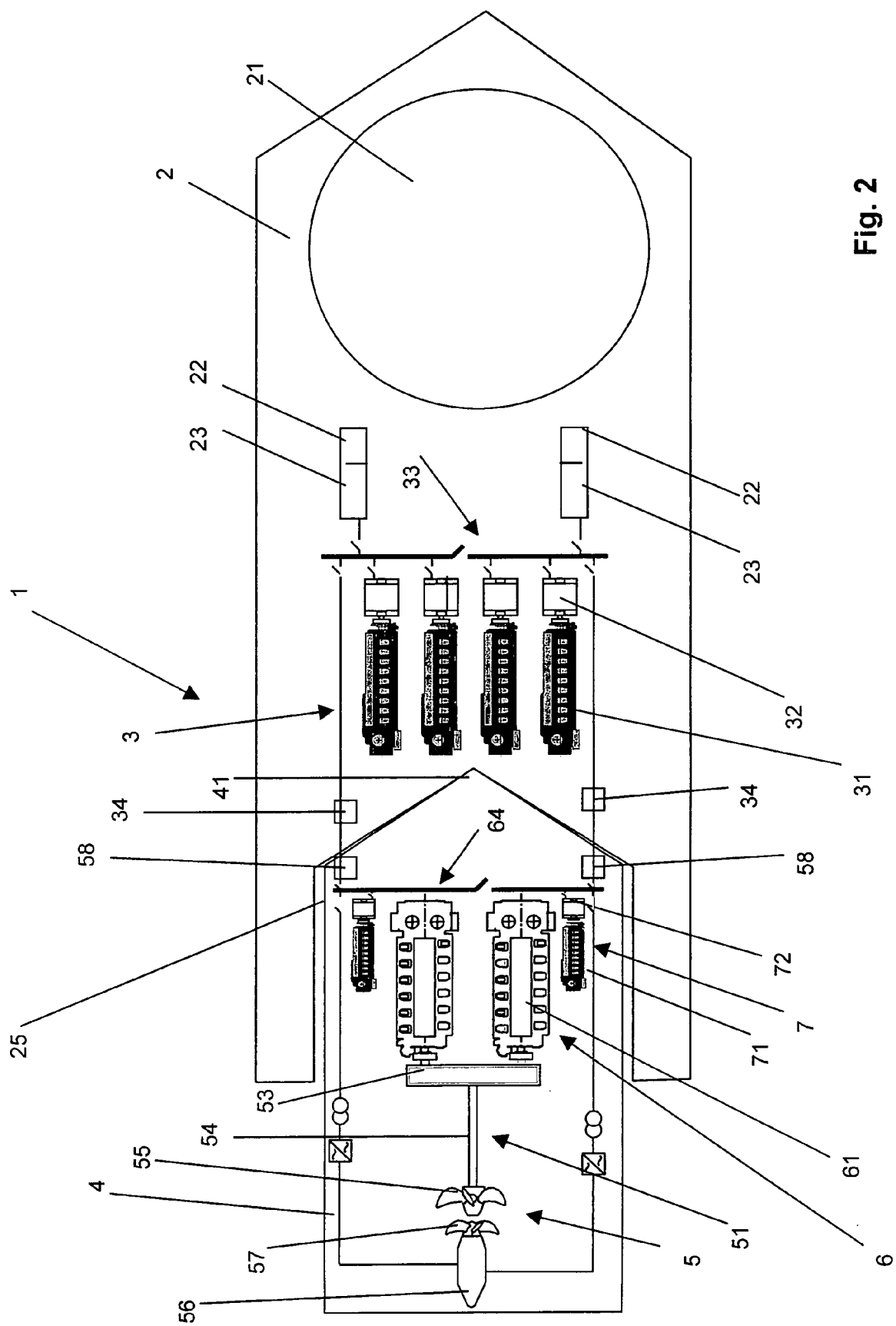
FIG. 2 shows a second embodiment of a barge arrangement.

FIG. 2 shows a barge arrangement 1 which basically corresponds to the embodiment shown in FIG. 1, whereby the same reference numerals are used for corresponding components and are not further discussed in connection with this embodiment.

In this embodiment the second power generating means 6 on the tug unit 4 additionally comprises the tug unit's main switchboard 64, which includes connectors, switches, etc. The second power connection means 58, to which the electrical power generated on the barge unit 2 is transferred by way of the first power connection means 34 on the barge unit 2, may then be connected to the electrical propulsion unit 56 and/or to the second main switchboard 64. The electrical propulsion unit 56 is preferably also connected to the second main switchboard 64.

In this case it would be advantageous also to have the third power generating means 7, comprising the third combustion engine 71 and the third generator 72, connected to the second main switchboard 64.

A parallel operation of the power generating means on the barge unit and the tug unit, as well as a coordinated distribution of electrical power from the main switchboards, e.g. for the propulsion systems and the hotel loads, may be arranged by an appropriate control system, preferably automatic, in order to achieve a high efficiency and energy economics.

For example, when the barge arrangement 1 operates as a combination in the first operating mode, the power may be generated on the barge unit 2 and transmitted to the second main switchboard 64 on the tug unit 4. The power could then be used both for the electrical propulsion unit 56 and the hotel load, whereby the second power generating means 6 and the third power generating means 7 could be on standby. The mechanical propulsion unit 51 and the electrical propulsion unit 56 can of course also be used in parallel. When the tug unit 4 operates freely, it would generally be propelled by the mechanical propulsion unit 51. However, the electrical propulsion unit 56 could also be used when desired, by way of the second electrical network 64 and the third power generating means 7.

Figure 3:
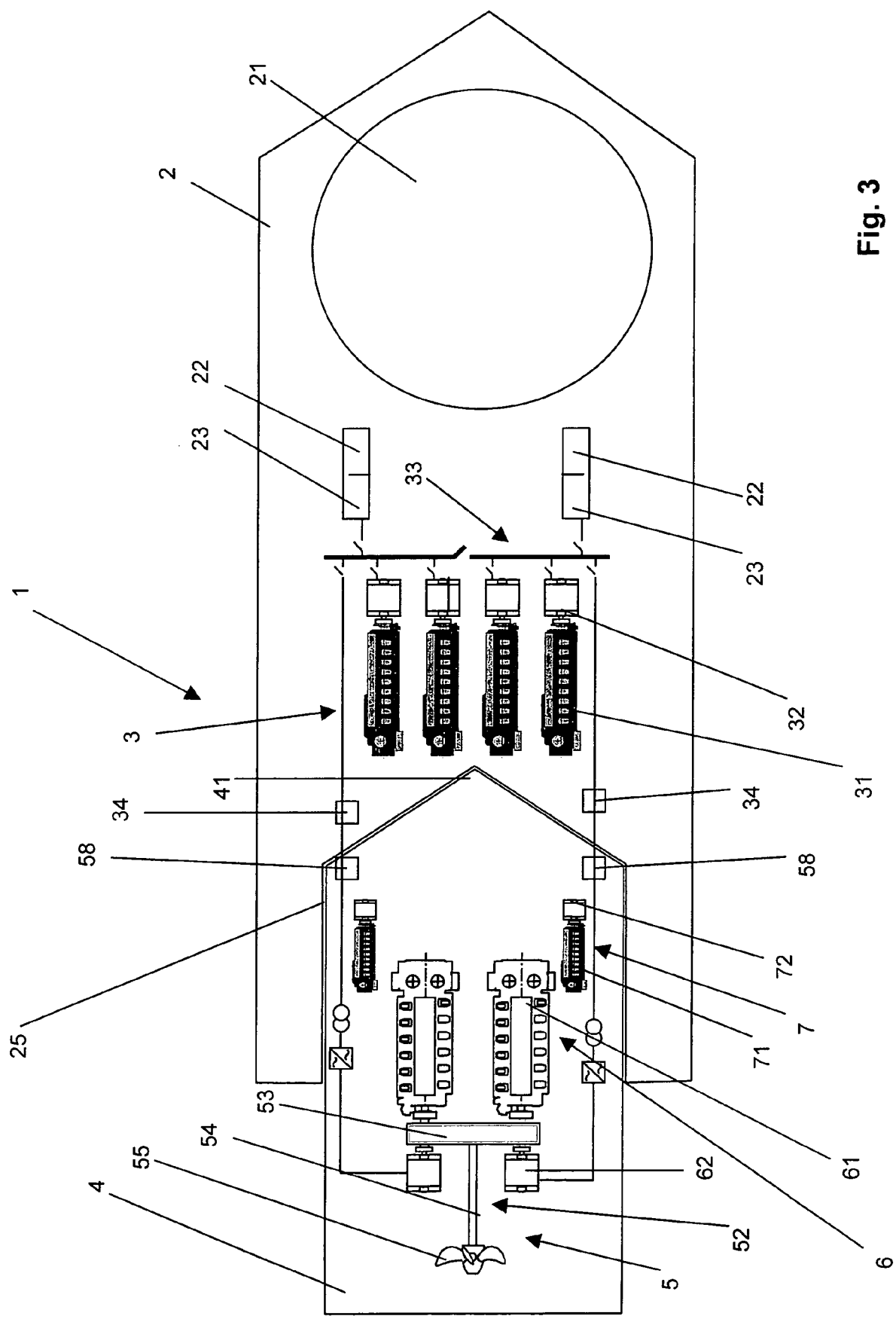
FIG. 3 shows a third embodiment of a barge arrangement.

FIG. 3 shows a barge arrangement 1, which largely has the same set-up as the barge arrangement of FIG. 1, whereby the same reference numerals are used for corresponding components and are not further discussed in connection with this embodiment. The main difference is in the machinery arrangement of the tug unit 4.

The propulsion system 5 of the tug unit 4 comprises a combined mechanical and electrical propulsion unit 52, typically with a gear 53, shaft 54 and propeller 55. The propulsion unit 52 may be powered by two second combustion engines 61, for example diesel engines, coupled to the gear 53 or two electric motors 62 coupled to the same gear 53.

In the second operating mode of the barge arrangement 1, in which the tug unit 4 operates freely without the barge unit 2, the combined mechanical and electrical propulsion unit 52 would be powered by the second combustion engines 61.

In the first operating mode of the barge arrangement 1, the combined mechanical and electrical propulsion unit 52 may be powered by the electric motors 62. In this case the electric motors 62 are run by electrical power provided from the first main switchboard 33 on the barge unit 2, by way of the first power connection element 34, second power connection element 58 and appropriate power connections indicated by lines in FIG. 3. This alternative would be used when the tug unit 4 transports the barge unit 2, i.e. in the first operating mode of the barge arrangement 1, when the tug unit 4 is connected or engaged with the barge unit 2, as described in connection with FIG. 1.

The tug unit 4 may further be provided with some electric production capacity of its own, by way of a third power generating means 7, comprising a combustion engine 71 and second generator 72, for example for the hotel load of the tug unit 4.

Figure 4:
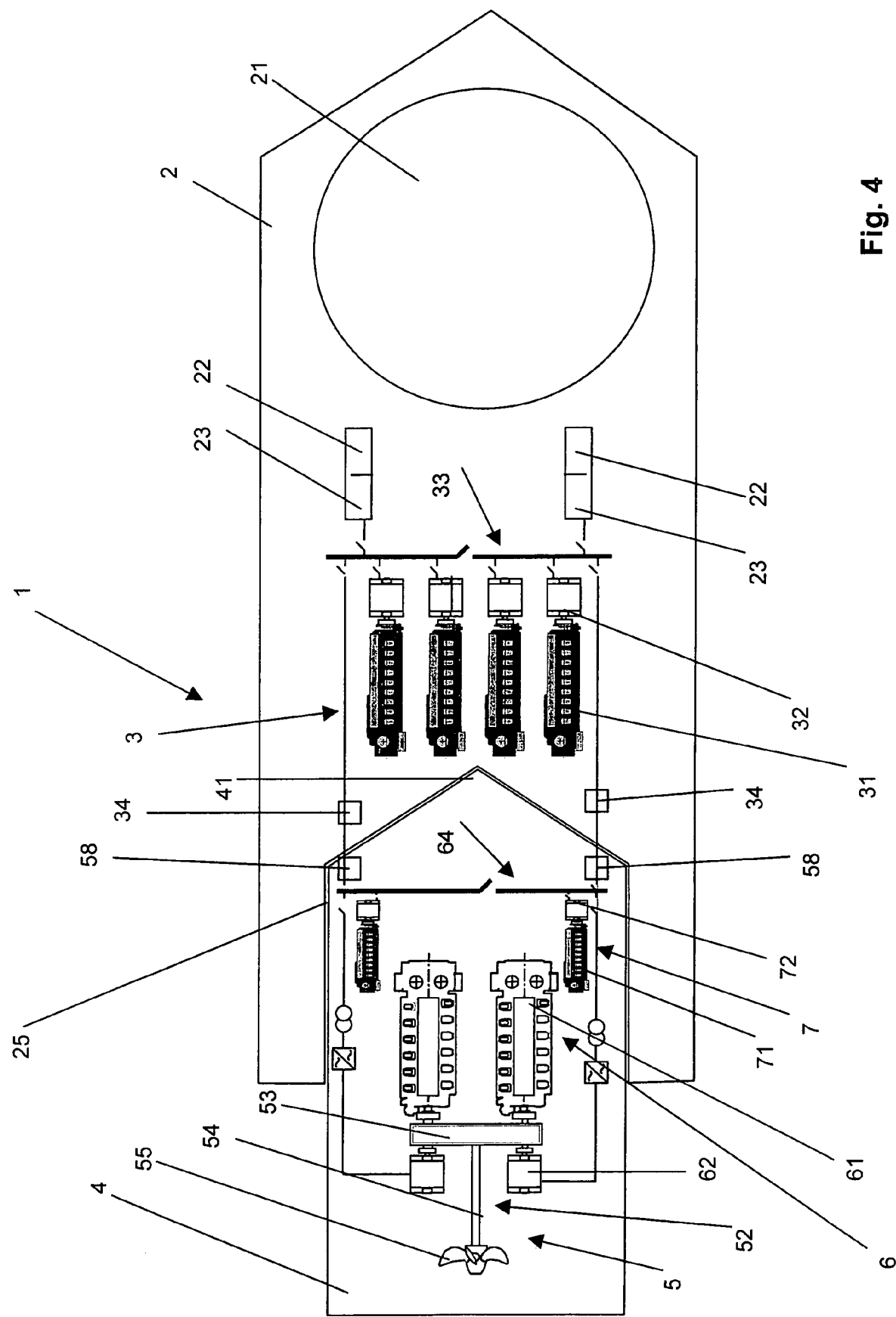
FIG. 4 shows a fourth embodiment of a barge arrangement.

FIG. 4 shows another embodiment of a barge arrangement 1, which basically corresponds to the barge arrangement shown in FIG. 3, whereby the same reference numerals are used for corresponding components and are not further discussed in connection with this embodiment.

In this embodiment the second power generating means 6 on the tug unit 4 additionally comprises a second main switchboard 64. The second power connection means 58, to which the electrical power generated on the barge unit 2 is transferred by way of the first power connection means 34 on the barge unit 2, may then be connected to the electric motors 62 and/or to the second main switchboard 64. The electric motors 62 would preferably also be connected to the second main switchboard 64.

In this case it would be advantageous also to have the third power generating means 7, comprising the third combustion engine 71 and the third generator 72, connected to the main switchboard 64.

A parallel operation of the power generating means on the barge unit and the tug unit, as well as a coordinated distribution of electrical power from the main switchboards, e.g. for the propulsion systems and the hotel loads, may be arranged by an appropriate control system, preferably automatic, in order to achieve a high efficiency and energy economics, principally in a corresponding way as discussed above in connection with FIG. 2.

In the embodiments of FIGS. 1–4, the third combustion engine 71, as well as the second combustion engine 61, could be a diesel engine or a gas driven engine or dual-fuel engine using the boil-off gas or forced boil-off gas from the barge unit 2. The two latter engine types would of course imply that arrangements for providing gas to the tug unit 4 would have to be made.

Figure 5:
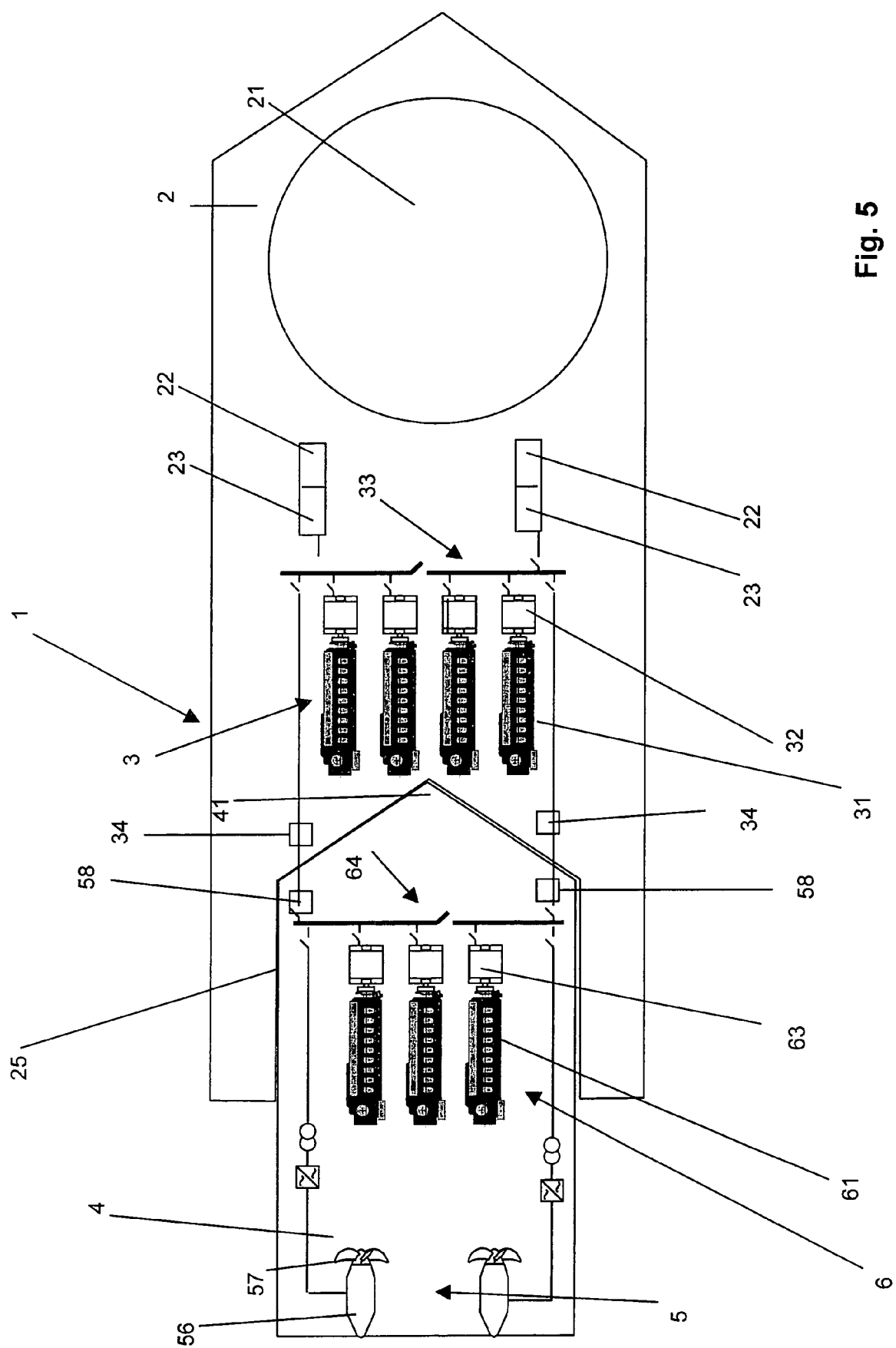
FIG. 5 show a fifth embodiment of a barge arrangement.

FIG. 5 also shows a corresponding barge arrangement 1 as disclosed above in connection with FIGS. 1–4, whereby the same reference numerals are used for the same components, and are not further discussed in connection with this embodiment. The main difference lies in the machinery arrangement of the tug unit 4. Thus, whereas the tug units shown in FIGS. 1–4 each are provided with combustion engines for driving the propellers 55 and also with one or more turnable propulsion pods, the tug unit shown in FIG. 5 runs on electrical power only and includes an electric power plant 6.

The propulsion system 5 of the tug unit shown in FIG. 5 comprises two electrical propulsion units 56, for example turnable propulsion pods with propellers 57.

In the first operating mode of the barge arrangement 1, when the tug unit 4 and the barge unit 2 are connected or engaged, the electrical propulsion units 56 may receive their power from the first main switchboard 33 on the barge unit 2 (as discussed above in connection with FIG. 1). The power from the first main switchboard 33 may be transmitted either directly to the electrical propulsion units 56, or via the second main switchboard 64 on the tug unit 4, as discussed in the following.

In the second operating mode of the barge arrangement, when the tug unit 4 operates freely, the electrical propulsion units 56 receive their power from the electric power plant on the tug unit 4. The tug unit 4 is thus provided with three second combustion engines 61 coupled to respective second generators 63, which feed electrical power to the second main switchboard 64 on the tug unit 4. In practice this means that when the barge arrangement 1 operates in a second mode, i.e. when the tug unit 4 operates freely, its propulsion system 5 is powered from its own second main switchboard 64.

The appropriate power connections are indicated by lines in FIG. 5.

The hotel load of the tug unit 4 is covered by the electric power plant of the tug unit.

The second combustion engine 61 could be a diesel engine, a gas driven engine or dual-fuel engine using the boil-off gas or forced boil-off gas from the barge unit 2. The two latter engine types would of course imply that arrangements for providing gas to the tug unit 4 would have to be made.

A parallel operation of the power generating means on the barge unit and the tug unit, as well as a coordinated distribution of electrical power from the main switchboards, e.g. for the propulsion systems and the hotel loads, may be arranged by an appropriate control system, preferably automatic, in order to achieve a high efficiency and good energy economics.

It is clear that the dimensions, number and types of combustion engines (e.g. even a boiler steam turbine combination, where the steam turbine would be running the propulsion unit or the generator, or a gas turbine), electric motors, generators, propulsion units, LNG tanks, gas evaporation means and gas supply means may be chosen according to prevailing circumstances and needs.

The dimensioning of the first power generating means on the barge unit, comprising the generated electric power as well as a possible supply of boil-off gas to the tug unit, is preferably done so that a maximum use of the boil-off gas can be achieved when a fully loaded barge unit returns from a gas supply terminal (discussed in connection with FIGS. 6–10 below). The dimensioning of the first power generating means, the propulsion system and the third power generating means has to be done accordingly.

In FIGS. 6–10 is shown an example of operation of a transportation system employing barge units 2 (FIGS. 1–5) and tug units 4 (FIGS. 1–5) embodying the invention. This transportation system employs four barges; first barge A, second barge B, third barge C and fourth barge D, and two tug units; first tug E and second tug F. Each of the barges is provided with four LNG receptacles 21. In other respects, the barges and tugs may be equipped as described in connection with FIGS. 1–5.

The LNG is loaded on the barges at a gas supply terminal 100 (e.g. at a gas field) from LNG supply units 101, whereby the loading or filling operation of the LNG receptacles 21 on the barge is indicated by arrow L. The LNG is transported for supply to a local gas network 103 (e.g. at a destination area) by way of a natural gas pipeline 102. The unloading or supply operation to the natural gas pipeline 102 is indicated by arrow U.

Figure 6:
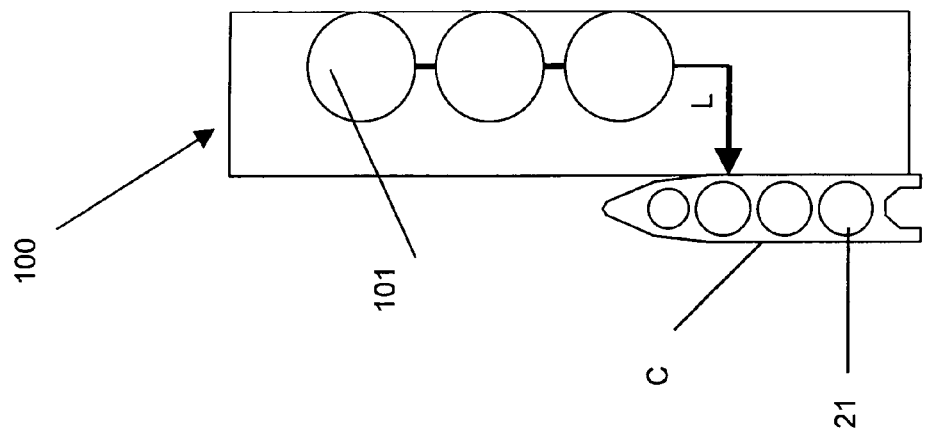
FIGS. 6–10 show an example of operation of a transportation system employing barge units and tug units according to the invention.
Figure 6:
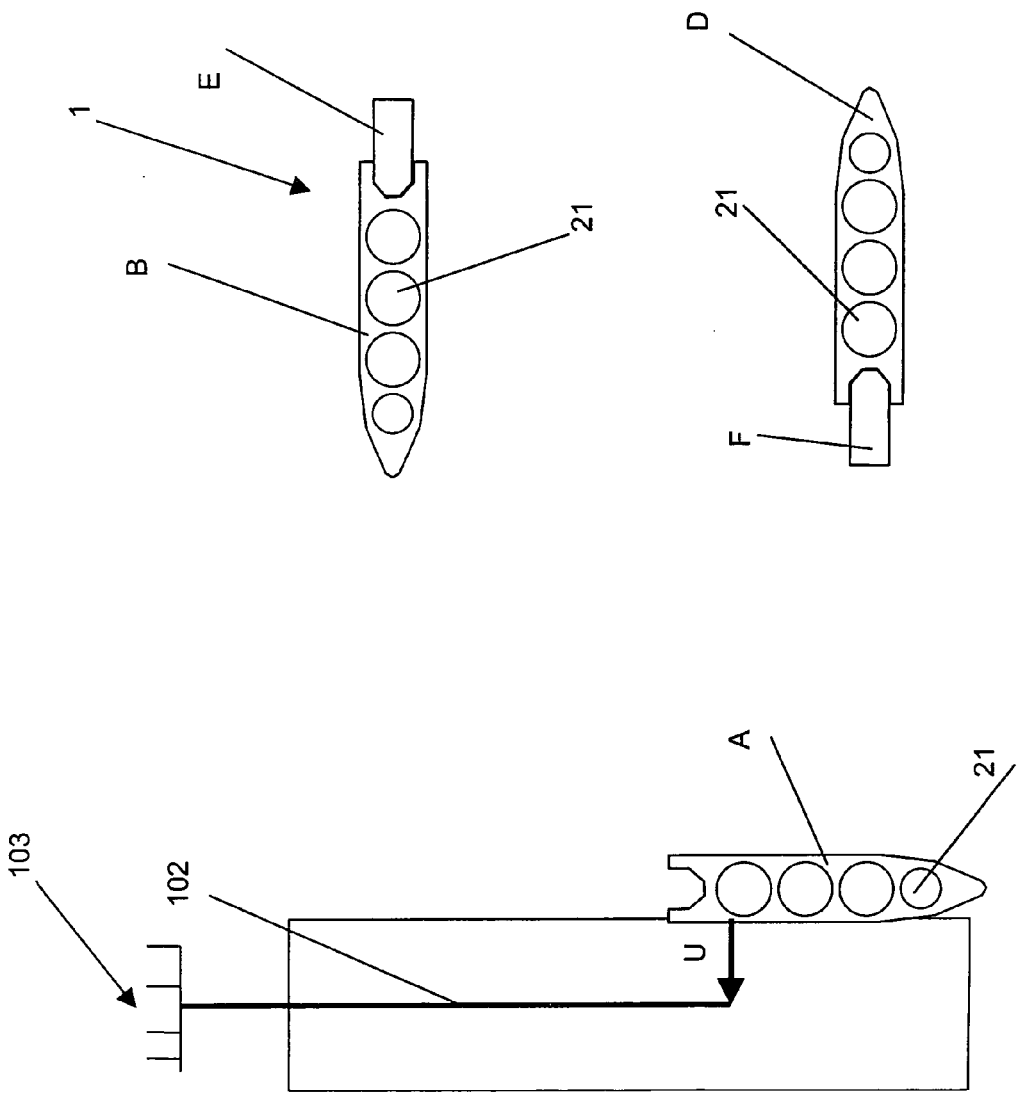

In FIG. 6, at a first phase of operation, the first barge A is unloading the natural gas at the destination area to the natural gas pipeline 102 for use in the local gas network 103. A first power generation means 3 (first combustion engine 31 run by boil-off gas, first generator 32, first main switchboard 33) powers the gas evaporation means 22 and/or the gas supply means 23 (FIGS. 1–5) on the first barge A for the unloading operation U. It is advantageous that both are powered from the first main switchboard, but power can also be provided from other sources.

At the same time the second barge B, with fully loaded LNG receptacles 21, is returning from the gas supply terminal 100 to the destination area in order to continue the supply of natural gas to the local gas network 103, when the first barge A begins to empty. The second barge B is pushed by a first tug E, which is propelled by its propulsion system 5, which at least partly is powered by a first power generation means 3 on the second barge B as described in connection with FIGS. 1–5 above. The third barge C is already carrying out a loading operation L at the gas supply terminal 100, in order to be able to replace the second barge B, when it in turn is finishing its unloading operation U. The fourth barge D has already left the destination area port for the gas supply terminal 100 and is pushed by a second tug F (in a corresponding manner as the barge arrangement with the second barge B and the first tug E), so that it can start the LNG loading operation when the previous barge, i.e. the third barge C, has finished its loading operation L and is preparing to leave for the destination area.

Figure 7:
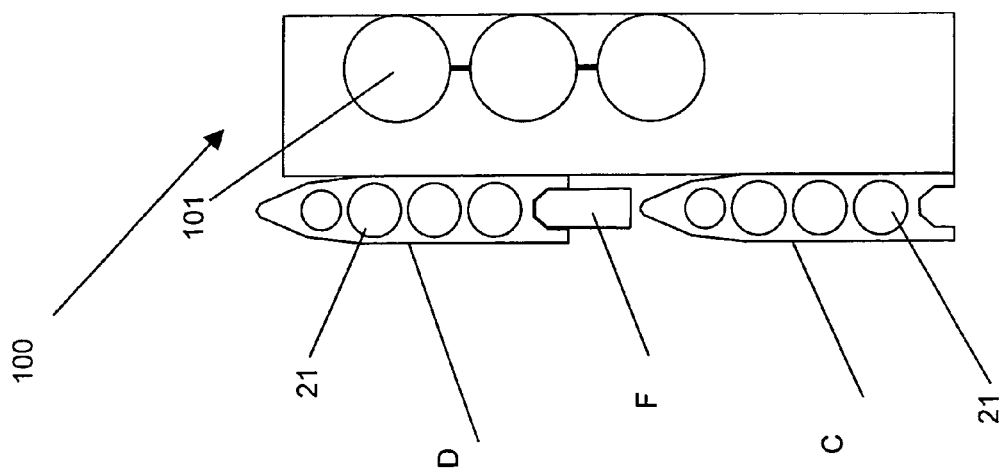
Figure 7:
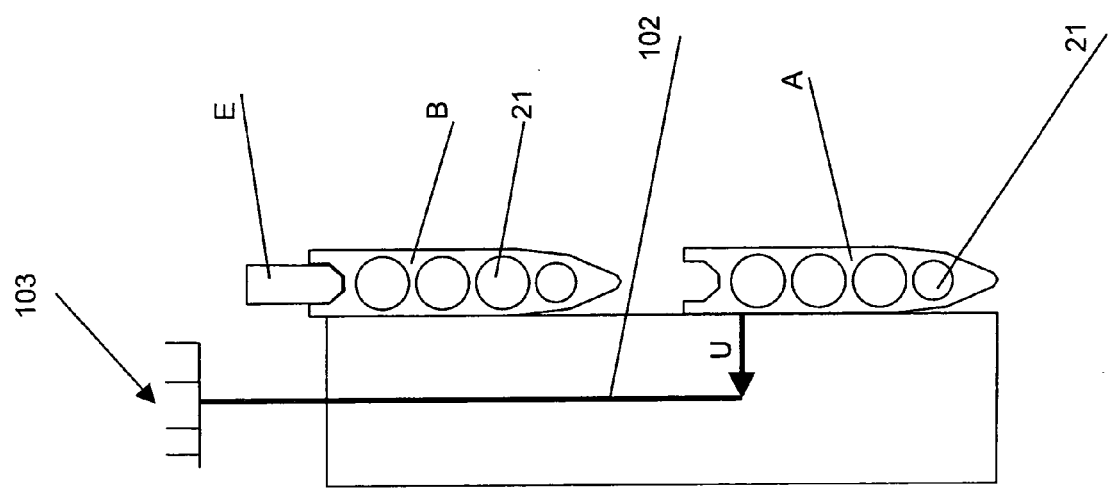

In FIG. 7, at a second phase, we are in the position anticipated by the first phase. The second barge B has docked in port at the destination area and is prepared for unloading. The first barge A is running low on natural gas and is ready to be taken out to the gas supply terminal 100 by the first tug E, which arrived in port with the second barge B.

Out at the gas supply terminal 100 a corresponding switch is also taking place. The fourth barge D has arrived and docked, while the third barge C is fully loaded and ready to leave for the destination area port, as soon as the second tug F is released from the fourth barge D and can engage with the third barge C for transport.

Figure 8:
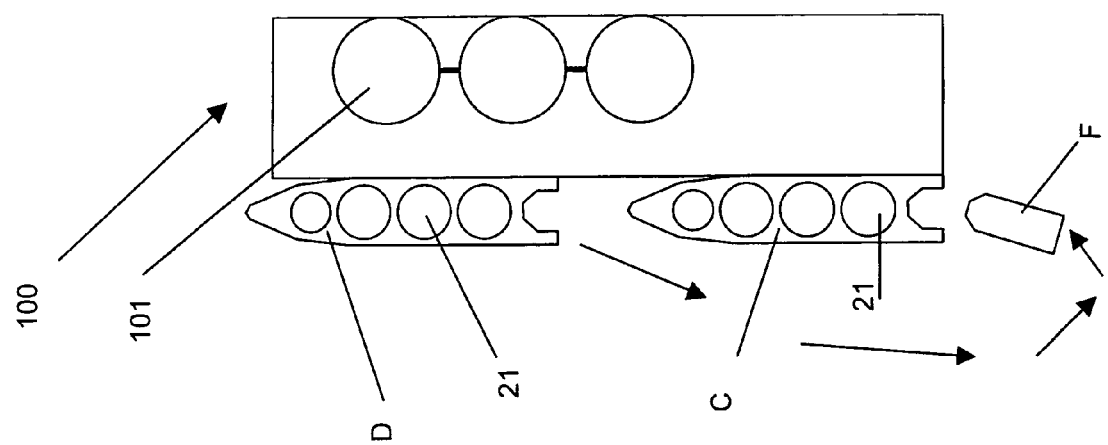
Figure 8:
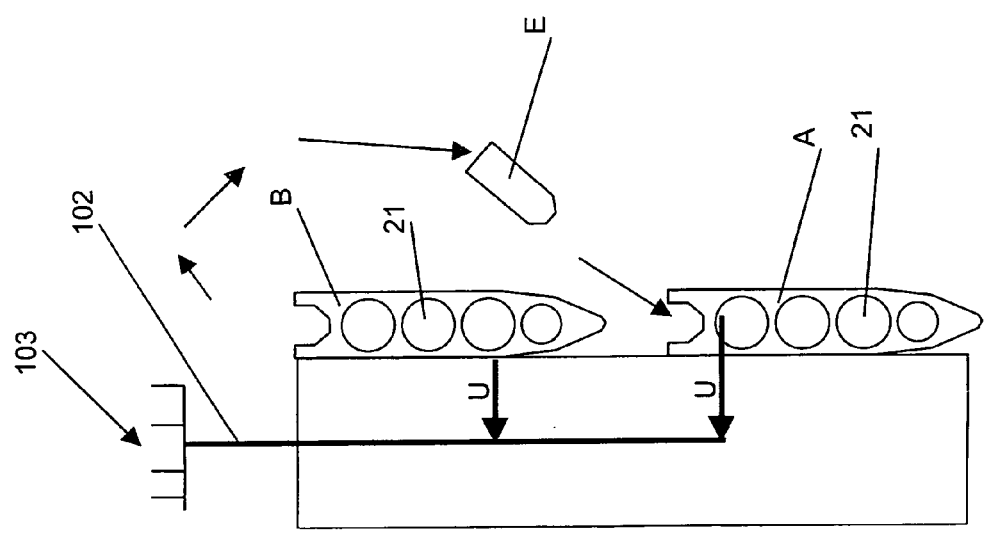

FIG. 8, a third phase, shows how at the destination area the first tug E disconnects from the second barge B in order to engage with the now almost empty first barge A. At the gas supply terminal 100, the second tug F is carrying out the same move leaving the fourth barge D, which is ready for loading, in order to engage with the third barge C, which is filled and ready to be taken to the destination area for continuing the supply of natural gas to the natural gas network 103, after the second barge B has finished its unloading operation U.

In this mode of operation of the barge arrangement, the first tug E and the second tug F operate freely, whereby their propulsion systems 5 (FIGS. 1–5) are run by the second power generation means 6, or by assistance of the third power generating means 7, on the respective tug unit 4 (FIGS. 1–5).

Figure 9:
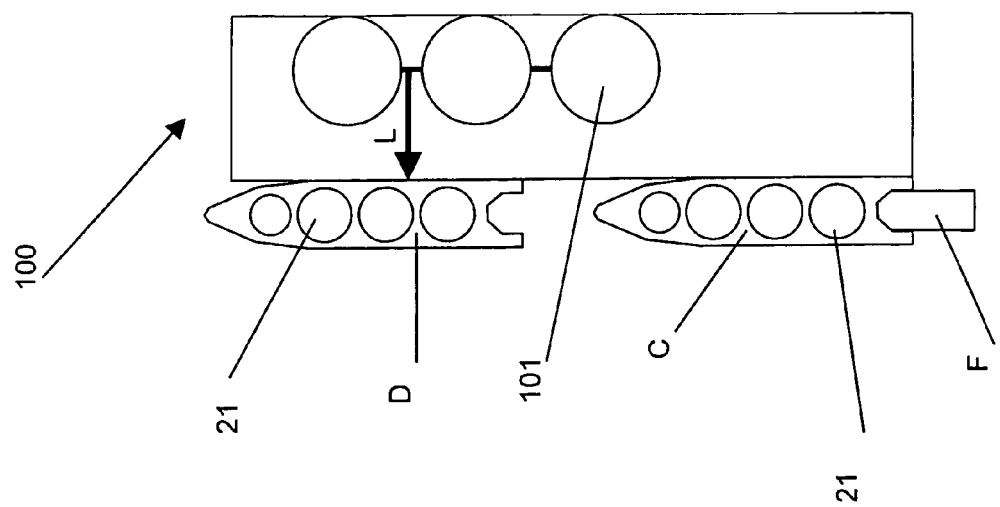
Figure 9:
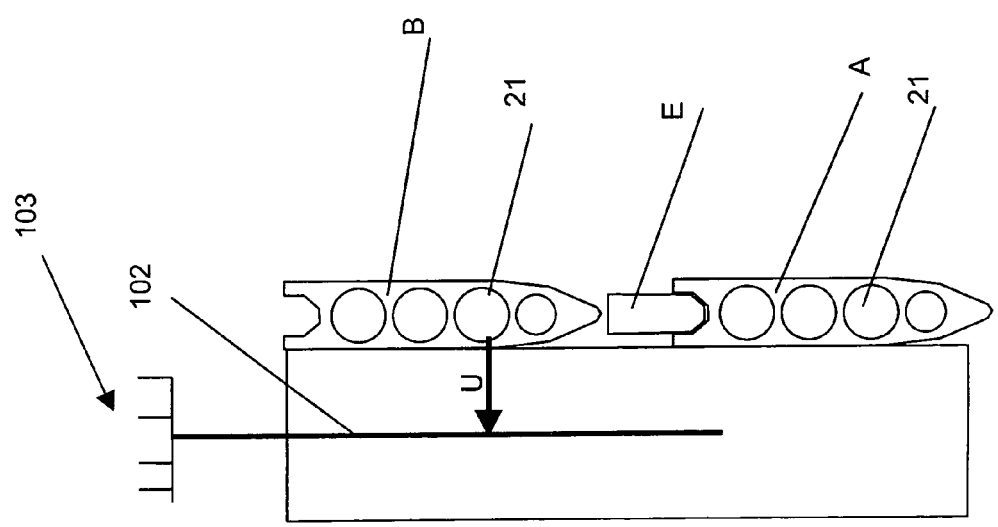

In FIG. 9, a fourth phase, the first tug E is engaged with the almost empty first barge A and the second tug F is engaged with the fully loaded third barge C and a fifth phase (FIG. 10) of the operation can begin. When the first tug E engages with the first barge A, the first tug A enters the recess 25 in the aft of the barge unit 2 (FIGS. 1–5), whereby the second power connection 58 in the front end 41 of the tug unit 4 connects with the first power connection means 34 in the recess 25 in the aft of the barge unit 2 (FIGS. 1–5). The same applies for the second tug F and the third barge C.

This generally applies to the tugs and barges when they engage.

Figure 10:
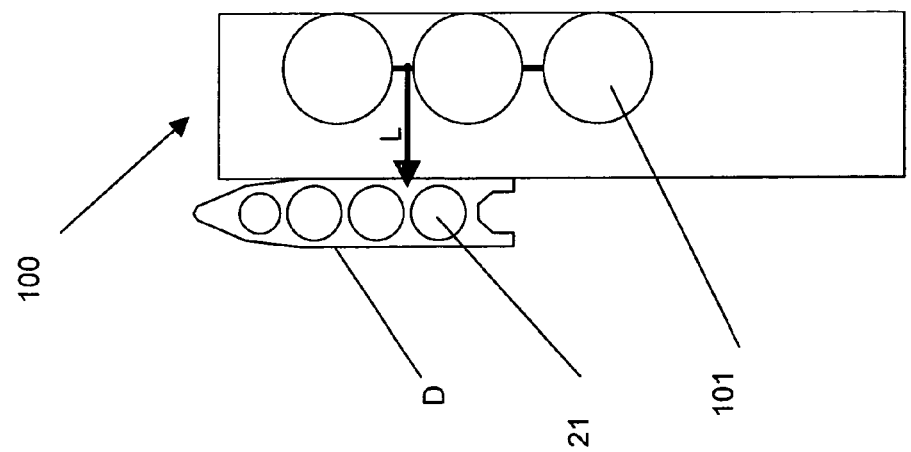
Figure 10:
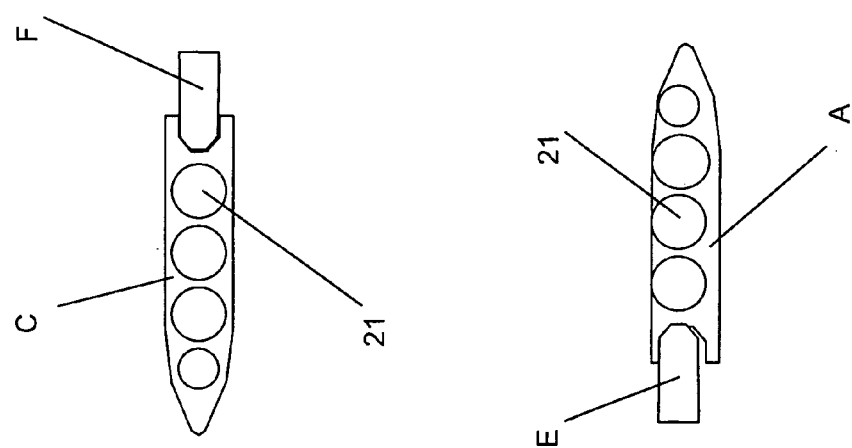
Figure 10:
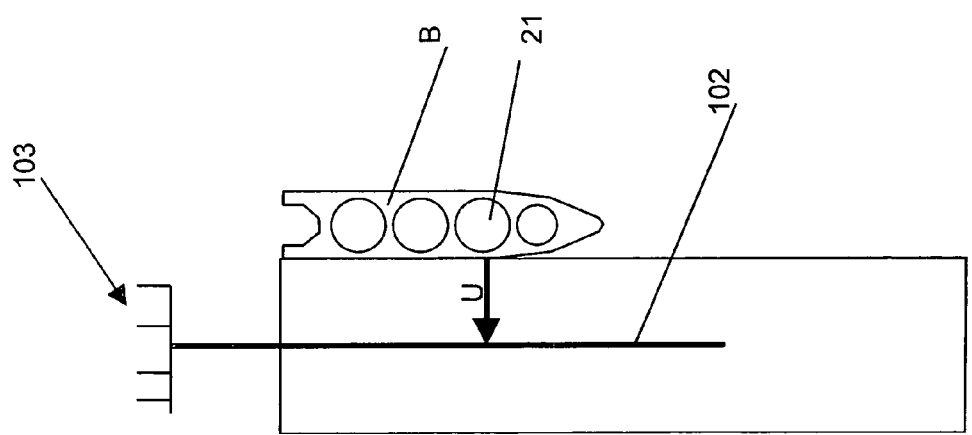

In the fifth phase, shown in FIG. 10, the almost empty first barge A is pushed by the first tug E towards the gas supply terminal 100, while the fully loaded third barge C is returned to port by the second tug F.

The above example is intended to illustrate, as an example only, the flexibility of operation of a transportation system made possible by the barge arrangement 1 according to the invention. It is clear the different set-ups of the barge unit 2 and the tug unit 4 as such according to the invention may be employed in a transportation system following the basic idea of the invention. The key of the transportation system is the barge arrangement 1. However, the barge unit 2 and tug unit 4 as such have their independent roles as well. It is also clear that they can be produced and handled by independent operators.

The drawings and the description related thereto are only intended for clarification of the basic idea of the invention. The invention may vary in detail within the scope of the ensuing claims.

The invention claimed is:

1. A barge arrangement for transporting LNG, the barge arrangement comprising:
    a barge unit for conveying a load of LNG, the barge unit comprising an LNG receptacle for containing the load of LNG and a first power generation means including a first combustion engine that is operated at least partly by LNG boil-off gas from the LNG receptacle and a first generator that is driven by the first combustion engine, and
    a tug unit comprising a propulsion system and a second power generation means for providing power to the propulsion system,
    and wherein, in a first operating mode of the barge arrangement the tug unit is connected to the barge unit for propelling the barge unit and the propulsion system of the tug unit can be powered at least partly by the first power generation means.

2. A barge arrangement according to claim 1, wherein the barge unit comprises a first main switchboard connected to the first generator and also comprises a power connection element connected to the first main switchboard.

3. A barge arrangement according to claim 2, wherein the barge unit comprises a gas evaporation means and a gas supply means, and at least one of the gas evaporation means and the gas supply means is powered by the first main switchboard.

4. A barge arrangement according to claim 1, wherein the second power generation means comprises a second combustion engine, the propulsion system comprises a mechanical propulsion unit and an electrical propulsion unit, and the tug unit comprises a second power connection element connected to the electrical propulsion unit.

5. A barge arrangement according to claim 4, wherein the second power generation means further comprises a second main switchboard and the second power connection element is connected to at least one of the second main switchboard and the electrical propulsion unit.

6. A barge arrangement according to claim 5, wherein the tug unit further comprises a third combustion engine and a third generator, and the third generator is connected to the second main switchboard.

7. A barge arrangement according to claim 4, wherein the tug unit further comprises a third combustion engine and a third generator.

8. A barge arrangement according to claim 1, wherein the second power generation means comprises a second combustion engine and an electric motor, the propulsion system comprises a combined mechanical and electrical propulsion unit, and the tug unit comprises a second power connection element connected to the electric motor.

9. A barge arrangement according to claim 8, wherein the second power generation means further comprises a second main switchboard and the second power connection element is connected to at least one of the second main switchboard and the electric motor.

10. A barge arrangement according to claim 9, wherein the tug unit further comprises a third combustion engine and a third generator, and the third generator is connected to the second main switchboard.

11. A barge arrangement according to claim 8, wherein the tug unit further comprises a third combustion engine and a third generator.

12. A barge arrangement according to claim 1, wherein the second power generation means comprises a second combustion engine, a second generator driven by the second combustion engine, and a second main switchboard, the second generator is connected to the second main switchboard, the propulsion system comprises an electrical propulsion unit, and the tug unit comprises a second power connection element connected to at least one of the second main switchboard and the electrical propulsion unit.

13. A barge unit for conveying a load of LNG, the barge unit comprising an LNG receptacle for containing the load of LNG, a power generation means including a first combustion engine that is operated at least partly by LNG boil-off gas from the LNG receptacle and a first generator that is driven by the first combustion engine, a first main switchboard connected to the first generator, and a first power connection element connected to the first main switchboard, whereby the barge unit can be used in combination with a tug unit comprising a propulsion system and a second power connection element that is connectable to the first power connection element when the tug unit is connected to the barge unit for propelling the barge unit.

14. A barge unit according to claim 13, comprising a gas evaporation means and a gas supply means, and wherein at least one of the gas evaporation means and the gas supply means is powered by the first main switchboard.

15. A method of transporting LNG from a gas supply terminal to a gas delivery terminal employing at least first and second barge units and at least one tug unit, wherein each barge unit comprises an LNG receptacle and a first power generation means including a first combustion engine that is operated at least partly by LNG boil-off gas and a first generator that is driven by the first combustion engine, the or each tug unit comprises a propulsion system and a second power generation means for providing power to the propulsion system, and the method comprises:

(a) loading LNG on the first barge unit at the gas supply terminal, (b) employing a tug unit to propel the first barge unit from the gas supply terminal to the gas delivery terminal, (c) unloading the first barge unit at the gas delivery terminal and loading LNG on the second barge unit at the gas supply terminal, and (d) employing a tug unit to propel the first barge unit to the gas supply terminal and employing a tug unit to propel the second barge unit to the gas delivery terminal, and wherein in step (b) the propulsion system of the tug unit is powered at least partly by the first power generation means of the first barge unit and in step (d) the propulsion system of the tug unit that is employed to propel the second barge unit is powered at least partly by the first power generation means of the second barge unit.

16. A tug unit comprising a propulsion system, a power generation means for providing power to the propulsion system, and a power connection element, whereby the tug unit can be used in combination with a barge unit comprising a first main switchboard and a power connection element that is connected to the first main switchboard and is connectable to the power connection element of the tug unit when the tug unit is connected to the bar unit for propelling the barge unit wherein the propulsion system comprises a mechanical propulsion unit and an electrical propulsion unit, the power generation means comprises a combustion engine, and the power connection element of the tug unit is connected to the electrical propulsion unit.

17. A tug unit according to claim 16, wherein the power generation means further comprises a main switchboard aboard the tug unit and the power connection element of the tug unit is connected to at least one of the main switchboard aboard the tug unit and the electrical propulsion unit.

18. A tug unit according to claim 17, wherein the tug unit further comprises a second combustion engine and a generator, and the generator is connected to the main switchboard aboard the tug unit.

19. A tug unit according to claim 16, wherein the tug unit further comprises a second combustion engine and a generator.

20. A tug unit comprising a propulsion system, a power generation means for providing power to the propulsion system, and a power connection element, whereby the tug unit can be used in combination with a barge unit comprising a firs main switchboard and a power connection element that is connected to the first main switchboard and is connectable to the power connection element of the tug unit when the tug unit is connected to the barge unit for propelling the barge unit, wherein the propulsion system comprises a combined mechanical and electrical propulsion unit, the power generating means comprises a combustion engine and an electric motor, and the power connection element of the tug unit is connected to the electric motor.

21. A tug unit according to claim 20, wherein the power generation means further comprises a main switchboard aboard the tug unit and the power connection element of the tug unit is connected to at least one of the main switchboard aboard the tug unit and the electric motor.

22. A tug unit according to claim 21, wherein the tug unit further comprises a second combustion engine and a generator, and the generator is connected to the main switchboard aboard the tug unit.

23. A tug unit according to claim 20, wherein the tug unit further comprises a second combustion engine and a generator.

* * * * *